(12) United States Patent
Diez et al.

(10) Patent No.: US 9,105,949 B2
(45) Date of Patent: Aug. 11, 2015

(54) CELL CONNECTOR

(71) Applicants: ElringKlinger AG, Dettingen (DE); Bayerische Motoren Werke Aktiengesellschaft, Munich (DE)

(72) Inventors: Armin Diez, Lenningen (DE); Jan Groshert, Dettingen (DE); Mark Laderer, Grabenstetten (DE); Christoph Tamegger, Grafenberg (DE); Matthias Müller, Pfullingen (DE); Wolfgang Fritz, Metzingen (DE); Michael Kohnle, Hülben (DE); Hubertus Goesmann, Nattheim-Auernheim (DE); Philipp Petz, Munich (DE); Axelle Hauck, Neubiberg (DE); Christoph Born, Munich (DE)

(73) Assignees: ElringKlinger AG, Dettingen (DE); Bayerische Motoren Werke Aktiengesellschaft

( * ) Notice: Subject to any disclaimer, the term of this patent is extended or adjusted under 35 U.S.C. 154(b) by 0 days.

(21) Appl. No.: 13/739,536

(22) Filed: Jan. 11, 2013

(65) Prior Publication Data

US 2013/0130081 A1    May 23, 2013

Related U.S. Application Data

(63) Continuation of application No. PCT/EP2011/061768, filed on Jul. 11, 2011.

(30) Foreign Application Priority Data

Jul. 15, 2010 (DE) .......................... 10 2010 031 380

(51) Int. Cl.
H01M 10/48 (2006.01)
H01M 2/20 (2006.01)
H01M 10/0525 (2010.01)

(52) U.S. Cl.
CPC ............ H01M 10/486 (2013.01); H01M 2/202 (2013.01); H01M 2/206 (2013.01); H01M 10/0525 (2013.01); H01M 2200/10 (2013.01)

(58) Field of Classification Search
None
See application file for complete search history.

(56) References Cited

U.S. PATENT DOCUMENTS

| 8,410,372 | B2 | 4/2013 | Kinoshita et al. | |
|---|---|---|---|---|
| 2002/0022178 | A1* | 2/2002 | Asaka et al. | 429/158 |
| 2003/0185278 | A1* | 10/2003 | Roepke et al. | 374/152 |
| 2008/0179082 | A1 | 7/2008 | Kinoshita et al. | |
| 2010/0203368 | A1 | 8/2010 | Matthias | |
| 2011/0177379 | A1* | 7/2011 | Maguire | 429/154 |

FOREIGN PATENT DOCUMENTS

JP    2002246074 A    8/2002

* cited by examiner

Primary Examiner — Patrick Ryan
Assistant Examiner — Haixia Zhang
(74) Attorney, Agent, or Firm — Womble Carlyle Sandridge & Rice, LLP

(57) ABSTRACT

In order to enable the temperature in the region of at least one of the cell terminals that are connected to one another in an electrically conductive manner by a cell connector to be determined in a simple and reliable manner, there is proposed a cell connector for connecting a first cell terminal of a first electro-chemical cell and a second cell terminal of a second electro-chemical cell of an electro-chemical device in an electrically conductive manner which comprises a base body and a temperature sensing element that is fixed to the base body.

13 Claims, 12 Drawing Sheets

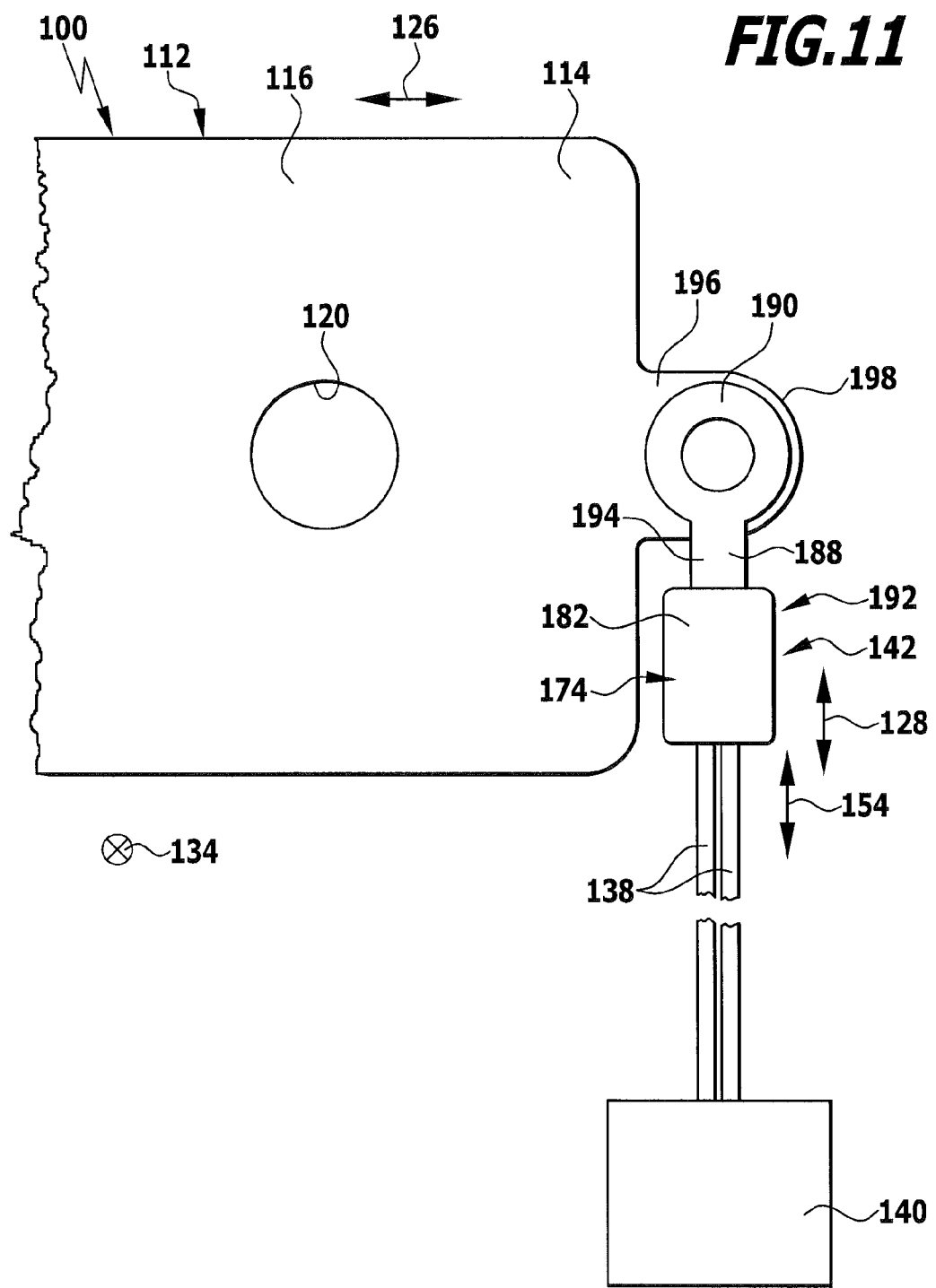

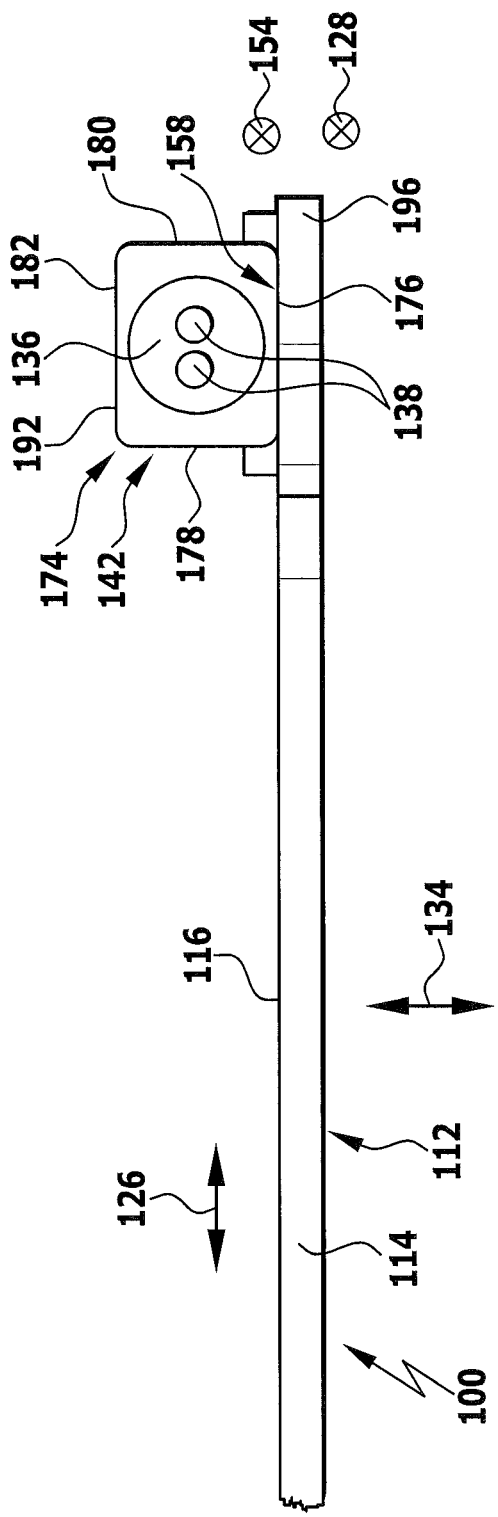

CELL CONNECTOR

CROSS-REFERENCE TO RELATED APPLICATION

This application is a continuation application of PCT/EP2011/061768, filed on Jul. 11, 2011, which claims priority to German Patent Application No. 10 2010 031 380.7, filed on Jul. 15, 2010, the entire specifications of which are incorporated herein by reference.

FIELD OF THE INVENTION

The present invention relates to a cell connector for connecting a first cell terminal of a first electro-chemical cell and a second cell terminal of a second electro-chemical cell of an electro-chemical device in an electrically conductive manner.

Such electro-chemical devices may be in the form of electrical accumulators, particularly lithium ion accumulators for example.

In a lithium ion accumulator, the voltage difference between the two cell terminals (poles) of an individual accumulator cell amounts to approximately 3.6 V. In order to obtain a higher voltage level of e.g. approximately 360 V which is necessary for many applications such as for automobile propulsion systems for example, a plurality of such accumulator cells (approximately 100 for example) have to be connected electrically in series.

The accumulator cells or, more generally, the electro-chemical cells can be combined into modules which each contain a plurality of such electro-chemical cells, whereby the direction in which adjacent cells are installed alternates so that positive and negative cell terminals are located next to each other in alternating manner.

These mutually adjacent cell terminals of opposite polarity are connected directly together by means of a respective cell connector so as to produce the series circuit of the cells.

Furthermore, in the case of an electro-chemical device and especially an electrical accumulator, it is necessary to monitor the temperature of the electro-chemical cells for system control purposes and so as to ensure operational reliability.

BACKGROUND OF THE INVENTION

For this purpose, it is known to place a temperature measuring element in contact with the outer casing of the electro-chemical cell for which the temperature is to be determined. Furthermore, it is known to sample the temperature indirectly via a metallic temperature-transferring component on a printed circuit board by means of an NTC element in the form of a surface mounted device (SMD).

SUMMARY OF THE INVENTION

The object of the present invention is to enable the temperature in the region of at least one of the cell terminals that are connected together in an electrically conductive manner by a cell connector to be determined in a simple and reliable manner by means of a cell connector of the type specified hereinabove.

In accordance with the invention, this object is achieved in the case of a cell connector incorporating the features of the preamble of claim 1 in that the cell connector comprises a base body and a temperature sensing element which is fixed to the base body.

Due to the fixing of the temperature sensing element or temperature sensor to the base body of the cell connector, the temperature sensing element is located very close to the point where the temperature is relevant, namely, very close to the cell terminals of the electro-chemical cells that are connected by the cell connector.

Preferably, the temperature sensing element is arranged next to a cell terminal which forms a negative pole of the electro-chemical cell concerned.

Due to the placement of the temperature sensing element at a relevant point, the temperature of interest can be determined with a very small tolerance window.

The difference between the temperature measured by the temperature sensing element and the actual temperature of the electro-chemical cell that is of interest is very small.

Furthermore, temperature variations can be determined within very short response times due to the very small spacing between the temperature sensing element and the adjacent cell terminal of the electro-chemical cell.

In a preferred embodiment of the invention, provision is made for the base body to comprise a holder for the temperature sensing element in which the temperature sensing element is at least partly, but preferably substantially completely, accommodated.

The temperature sensing element is prevented from movement relative to the base body of the cell connector in at least one or more directions by virtue of its form-fit with the temperature sensing element holder.

In particular, provision may be made for the temperature sensing element holder to surround the temperature sensing element over at least half, preferably over at least approximately 75%, of the periphery of the temperature sensing element.

It is expedient if, with respect to a central longitudinal axis of the temperature sensing element, the temperature sensing element holder extends around the temperature sensing element over a peripheral angle of at least approximately 180°, preferably of approximately 270°.

It is particularly expedient, if the temperature sensing element holder is in the form of a substantially closed ring.

The fixation of the temperature sensing element by means of the temperature sensing element holder can be effected by shaping part of the base body of the cell connector so that this fixation process is achieved by means of inherently necessary components and no additional parts are needed.

In particular, provision may be made for the temperature sensing element holder to comprise a preferably substantially trough-shaped pocket for accommodating the temperature sensing element and a flap for restraining the temperature sensing element in the pocket.

The temperature sensing element can then be inserted into the pocket whilst the flap is in an open position, and the temperature sensing element holder can be subsequently closed by moving the flap from the open position into a closed position.

In connection therewith, it is expedient if the cell connector has a stop which limits the path of the flap into the closed position when closing the temperature sensing element holder and thereby prevents the temperature sensing element from being damaged.

In a special embodiment of the invention, provision is made for the pocket and the flap to be formed together in one piece manner.

Furthermore in this connection, provision is preferably made for the pocket and the flap to be formed in one piece manner with a contact region of the cell connector at which the cell connector is connected (preferably by means of a substance-to-substance bond) to a cell terminal of an electro-chemical cell.

If the contact region of the cell connector is formed in multiple layers, then the pocket and the flap are preferably connected in one piece manner to one of the layers of the contact region of the cell connector.

In an alternative particular embodiment of the invention, provision is made for the pocket to be formed in one piece manner with a first layer of the base body and the flap to be formed in one piece manner with a second layer of the base body.

In this connection, apart from the first and the second layer, the base body may comprise any desired number of further layers.

In order to enable the flap to be easily moved from the open position into the closed position, it is of advantage in each case if the flap is connected by a web member to the pocket and/or to a part of the base body of the cell connector and in particular, to a contact region of the cell connector.

This web member is formed preferably such that it is narrower than the pocket and/or narrower than the flap so that the web member is more easily deformable than the pocket or the flap.

In particular, provision may be made for the web member to be bounded on at least one side by a recess which reduces the extent of the web member.

Due to the form-fit between the temperature sensing element and the temperature sensing element holder, the temperature sensing element is prevented from shaking free when the electro-chemical device is operative.

In order to additionally fix the temperature sensing element to the temperature sensing element holder, it is of advantage if the temperature sensing element is fixed to the temperature sensing element holder by adhesion by an adhesive.

Such an adhesive preferably exhibits high thermal conductivity in order to ensure low contact resistance and good heat transfer between the temperature sensing element holder and the temperature sensing element.

Suitable heat-conductive adhesives are a two component epoxy resin, an elastomer or a conductive synthetic material for example.

As an alternative or in addition to the adhesion of the temperature sensing element by an adhesive, provision may also be made for a support (pad) as well as the temperature sensing element to be arranged in the temperature sensing element holder, whereby the temperature sensing element adheres to the support and/or the support jams the temperature sensing element in the temperature sensing element holder.

In particular, such a support can be resiliently and/or plastically deformable.

In a particular embodiment of the invention, provision is made for the temperature sensing element to be arranged at least partly but preferably substantially completely in a temperature sensing element housing which is fixed to the base body of the cell connector.

In order to facilitate the fixing of the temperature sensing element housing to the base body of the cell connector, provision may be made for the base body of the cell connector to comprise a projection to which the temperature sensing element housing is fixed.

Preferably, the temperature sensing element housing is fixed to the base body of the cell connector by means of a substance-to-substance bond.

In particular, provision may be made for the temperature sensing element housing to be fixed to the base body by welding, in particular by laser welding, by ultrasonic welding, by resistance welding or friction welding, by soldering and/or by being adhered to the base body.

In a preferred embodiment of the invention, provision is made for the largest extent of the temperature sensing element housing to be smaller than the largest extent of the base body of the cell connector in a transverse direction of the cell connector that runs perpendicularly to a plane which contains the longitudinal axes of the two electro-chemical cells in the installed state of the cell connector. It is thereby ensured that the spacing of the temperature sensing element from the relevant point of the cell connector or from the electro-chemical cells for which the temperature is to be determined is not too large whereby the response time of the temperature sensing element is kept small.

The temperature sensing element is preferably arranged at an end region of the base body of the cell connector or adjacent to an end region of the base body of the cell connector.

If two cell terminals of different electrical polarity are connected to one another by the cell connector, then the temperature sensing element is preferably arranged such that it is closer to the cell terminal of negative polarity than to the cell terminal of positive polarity.

The temperature sensing element is preferably in the form of an NTC element ("Negative Temperature Coefficient"; NTC-thermistor), a PTC element ("Positive Temperature Coefficient"; PTC-thermistor), another type of thermal element or a Peltier element.

It is preferable for the base body of the cell connector (or, in the case of a multi-layer base body, the layer or the layers to which the temperature sensing element holder is connected) to consist of aluminum, copper, tin, zinc, iron, gold, silver and/or an alloy of one of the aforementioned metals.

Furthermore, the base body or the relevant layer of the base body may comprise another metal, another metallic alloy, an electrically conductive synthetic material and/or an electrically conductive carbon material.

The cell connector with a temperature sensing element in accordance with the invention is suitable in particular for use in an electro-chemical device which comprises at least a first electro-chemical cell having a first cell terminal, a second electro-chemical cell having a second cell terminal and a cell connector in accordance with the invention which connects the first cell terminal and the second cell terminal to one another in an electrically conductive manner.

In particular, such an electro-chemical device may be in the form of an electrical accumulator such as a lithium ion accumulator for example.

Preferably, such an electro-chemical device comprises an evaluating circuit to which the temperature sensing element of the cell connector is connected via at least one electrical connection line.

If the electro-chemical device in accordance with the invention is in the form of an accumulator, then it is suitable, in particular, as a heavy duty energy source for powering motor vehicles for example.

Further features and advantages of the invention form the subject matter of the following description and the graphical illustration of exemplary embodiments.

BRIEF DESCRIPTION OF THE DRAWINGS

FIG. 11 a schematic plan view from above of the contact region with the temperature sensing element housing depicted in FIG. 10; and FIG. 12 a schematic side view of the contact region with the temperature sensing element housing depicted in FIGS. 10 and 11.

Similar or functionally equivalent elements are designated by the same reference symbols in all of the Figures.

DETAILED DESCRIPTION OF THE INVENTION

Figure 1:
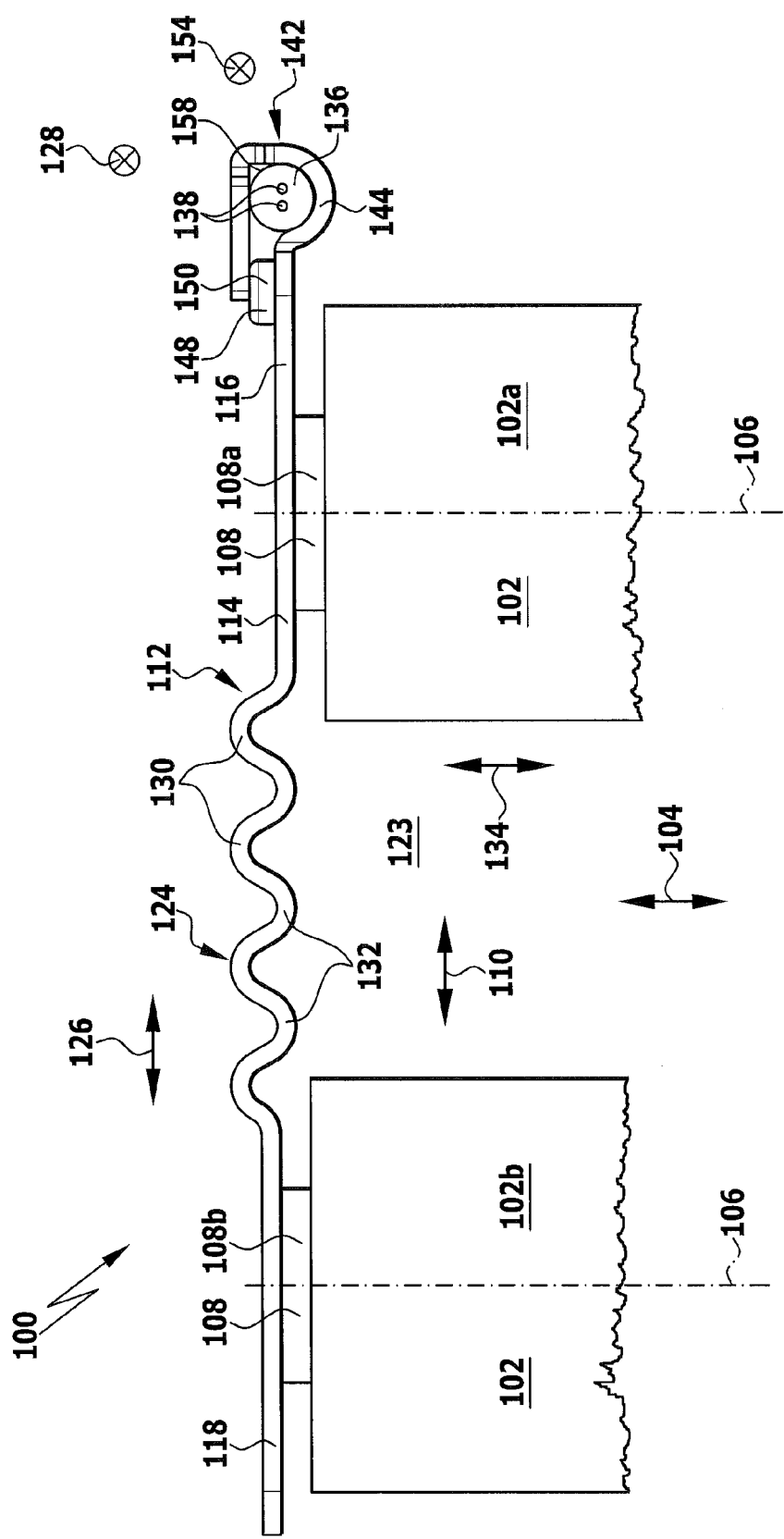
FIG. 1 shows a schematic side view of a cell connector and a part of the two electro-chemical cells which are connected to one another by means of the cell connector, wherein the cell connector comprises a base body and a temperature sensing element which is fixed to the base body.

An electro-chemical device bearing the general reference 100 comprises a plurality of (not shown) electro-chemical modules for example, each of which comprises a plurality e.g. eight, of electro-chemical cells 102 which are each accommodated in a holder of a (not shown) holding device of the module.

Such a holding device can, in particular, be in the form of a heat sink which is in heat conducting contact with the electro-chemical cells accommodated therein in order to dissipate the heat of the electro-chemical cells 102 during operation of the electro-chemical device 100.

The electro-chemical cells 102 are arranged and oriented in the holding device surrounding them in such a way that the axial directions 104 of the electro-chemical cells 102 which run parallel to the central longitudinal axes 106 of the electro-chemical cells 102 are aligned substantially in parallel with each other.

Each of the electro-chemical cells 102 extends from a front cell terminal 108 in the respective axial direction 104 up to a (not shown) rear cell terminal, wherein each cell terminal forms a positive pole or a negative pole of the electro-chemical cell 102 in each case.

The central longitudinal axes 106 of the electro-chemical cells 102 are at the same time the central longitudinal axes of the cell terminals 108 of the respective electro-chemical cells 102.

Within a module, mutually adjacent electro-chemical cells 102 are each oriented in such a way that the cell terminals of two adjacent cells 102a, 102b that are arranged on the same side of the module have mutually opposite polarities.

Thus, for example, in the cell arrangement shown in FIG. 1, the front cell terminal 108a of the electro-chemical cell 102a forms a negative pole of the electro-chemical cell 102a concerned, whilst the front cell terminal 108b of the electro-chemical cell 102b adjacent to the electro-chemical cell 102a in a connecting direction 110 forms a positive pole of the electro-chemical cell 102b.

The electro-chemical device 100 can, in particular, be in the form of an accumulator and in particular a lithium ion accumulator of the type $LiFePO_4$ for example.

Accordingly, the electro-chemical cells 102 of the electro-chemical modules can be in the form of accumulator cells, in particular, lithium ion accumulator cells of the type $LiFePO_4$ for example.

Furthermore, each electro-chemical module comprises a plurality of cell connectors 112 by means of which the cell terminals 108 of mutually adjacent electro-chemical cells 102 of different polarity are connected to one another in an electrically conductive manner in order to connect all the electro-chemical cells 102 of an electro-chemical module electrically in series in this way.

In connection therewith, each cell connector 112 connects a first cell terminal 108a of negative polarity to a second cell terminal 108b of positive polarity of an adjacent electro-chemical cell 102.

Apart from the front cell terminals 108 of mutually adjacent electro-chemical cells, the rear cell terminals of mutually adjacent electro-chemical cells of a module are also connected to one another by (not shown) cell connectors in order to connect all the electro-chemical cells 102 of a module electrically in series.

Each of the cell connectors 112, which each connect a first cell terminal 108a and a second cell terminal 108b to one another in an electrically conductive manner, comprises a base body 114 having a first contact region 116 which, in the installed state of the cell connector 112, is connected to a (negative for example) first cell terminal 108a of an electro-chemical cell 102, and a second contact region 118 which is connected to a (positive for example) second cell terminal 108b of another electro-chemical cell 102b in the installed state of the cell connector 112.

The base body 114 of the cell connector 112 is preferably in the form of a stamped and bent component.

In particular, the base body 114 of the cell connector 112 can consist of aluminum, copper, tin, zinc, iron, gold or silver or an alloy of one or more of the aforementioned metals.

Furthermore, the base body 114 of the cell connector 112 can also consist of another metal or of another metallic alloy.

Moreover, the base body 114 of the cell connector 112 could also be made from a conductive synthetic material and/or from a conductive carbon material.

The first contact region 116 and the second contact region 118 of the cell connector 112 are preferably connected to the respectively associated cell terminal 108a or 108b by means of a substance-to-substance bond.

In particular, such a substance-to-substance bond can be produced by welding and in particular laser welding, or by soldering.

In dependence on the material from which the cell terminals 108a and 108b are formed, provision may be made for one or more coatings particularly of a metallic material to be arranged on the respective contact region 116, 118 of the cell connector 112 and/or on the respective cell terminal 108a or 108b for the purposes of facilitating the production of a substance-to-substance bond to the cell connector 112.

Furthermore, provision may be made for one or more (not shown) intermediate elements to be arranged between the respective contact region 116, 118 of the cell connector 112 on the one hand and the respectively associated cell terminal 108a and 108b on the other for the purposes of facilitating the production of a substance-to-substance bond between the cell connector 112 and the cell terminals 108a, 108b.

Figure 3:
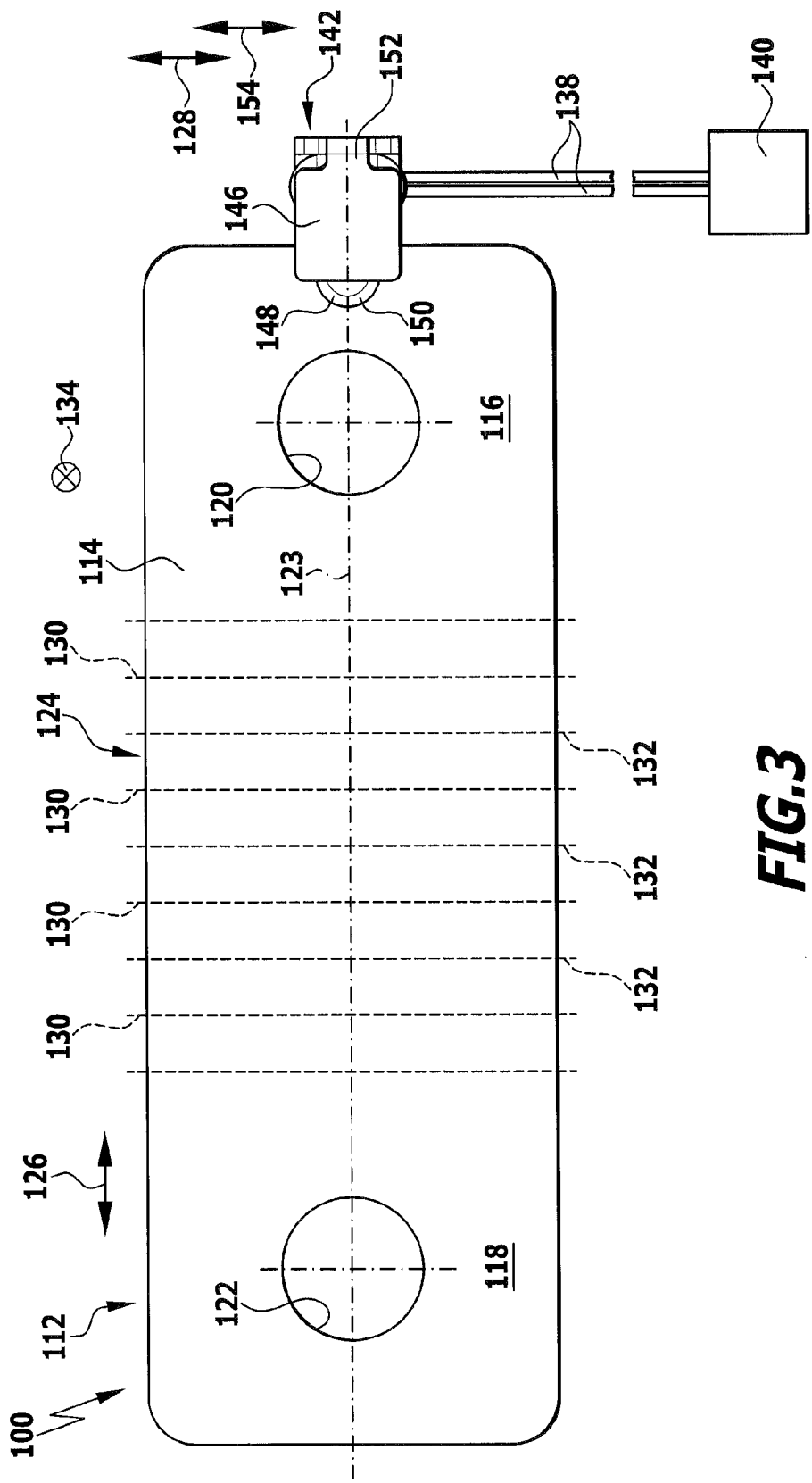
FIG. 3 a schematic plan view of the cell connector depicted in FIGS. 1 and 2.

In order to enable direct access to be made to the cell terminals 108a and 108b for e.g. measuring purposes even after a substance-to-substance bond between the cell connector 112 and the cell terminals 108a and 108b has been established, the first contact region 116 of the cell connector 112 can be provided with an e.g. substantially circular through opening 120 and the second contact region 118 of the base body 114 with an e.g. likewise substantially circular through opening 122 (see FIG. 3).

In operation of the electro-chemical device 100, due to differing temperatures and/or due to differing thermal coefficients of expansion of the cell connectors 112 on the one hand and the holder device for the electro-chemical cells 102 on the other, there might arise a difference between the longitudinal expansion of the cell connectors 112 on the one hand and an alteration in the spacing between the longitudinal axes 106 of the cell terminals 108a, 108b connected to one another by the cell connectors 112 on the other. The relative positions of the cell terminals 108a, 108b connected to one another by a cell connector 112 in the connecting direction 110 which is perpendicular to the axial direction 104 of the electro-chemical cells 102 are altered by a change of temperature.

The connecting direction 110 lies in a plane 123 which contains the longitudinal axes 106 of the electro-chemical cells 102a and 102b.

Furthermore, due to differing longitudinal expansions of the electro-chemical cells 102 connected to one another by a cell connector 112, there may be a resultant alteration in the relative positions between the mutually interconnected cell terminals 108a, 108b along the axial direction 104 of the electro-chemical cells 102 that are connected to one another.

In order to enable compensation to be made for such differences between a longitudinal expansion of the cell connector 112 on the one hand and a change in the spacing between the longitudinal axes 106 of the cell terminals 108a, 108b that are connected to one another by the cell connector 112 on the other and/or for such differences between a longitudinal expansion of a first electro-chemical cell 102a and a second electro-chemical cell 102b which are connected to one another by the cell connector 112, provision may be made for the cell connector 112 to comprise a resiliently and/or plastically deformable compensation region 124 which is arranged between the first contact region 116 and the second contact region 118 of the cell connector 112 and which connects the two contact regions 116 and 118 to one another.

Preferably, the base body 114 of the cell connector 112 is provided with such a compensation region 124.

In the case of the embodiment of a cell connector 112 shown in the Figures, the deformable compensation region 124 has a wave-like structure, wherein the wave-like structure comprises one or more e.g. four undulations having an amplitude which is oriented in parallel with the axial direction 104 of the cells 102 that are to be connected by the cell connector 112 and which is substantially perpendicular to the contact areas at which the cell connector 112 lies on the first cell terminal 108a or on the second cell terminal 108b in the installed state. These undulations comprise a plurality of, e.g. four, wave peaks 130 which run transversely, preferably substantially perpendicularly, to the axial direction 104 of the electro-chemical cells 102 and transversely, preferably substantially perpendicularly, to a longitudinal direction 126 of the cell connector 112 and substantially parallel to a transverse direction 128 of the cell connector 112 which is oriented perpendicularly with respect to the longitudinal direction 126 of the cell connector 112 and perpendicularly with respect to the axial direction 104 of the electro-chemical cells 102, and a plurality of wave troughs which are arranged between the wave peaks 130 and run transversely, preferably substantially perpendicularly, to the axial direction 104 of the electro-chemical cells 102 and transversely, preferably substantially perpendicularly, to the longitudinal direction 126 of the cell connector 112 and substantially parallel to the transverse direction 128 of the cell connector 112.

The wave peaks 130 project upwardly in a contact direction 134 of the cell connector 112 which is perpendicular to the contact areas of the cell connector 112 and which coincides with the axial direction 104 of the electro-chemical cells 102 in the installed state of the cell connector 112, whilst the wave troughs 132 project downwardly in the contact direction 134 (towards the cells 102 that are to be connected).

Due to the undulating structure of the deformable compensation region 124 of the cell connector 112, the effect is achieved that the compensation region 124 is readily deformable in resilient and/or plastic manner in such a way that the second contact region 118 can be displaced relative to the first contact region 116 in both the axial direction 104 of the electro-chemical cells 102 and in the longitudinal direction 126 of the cell connector 112 in order to even out the previously described differences in the relative positions of the cell terminals 108a and 108b that are to be connected to one another by the cell connector 112. The occurrence of excessive mechanical stresses at the junction points between the cell connector 112 on the one hand and the first cell terminal 108a and also the second cell terminal 108b on the other can thereby be prevented.

Furthermore, in order to enable the instantaneous operating temperature of the cell connector 112 (and thus the temperature of the electro-chemical cells 102 that are connected to one another by means of the cell connector 112) to be determined as precisely as possible, the cell connector 112 is provided with a temperature sensing element 136 which is fixed to the base body 114 of the cell connector 112 in heat conducting manner.

The temperature sensing element can, for example, be in the form of an NTC element ("Negative Temperature Coefficient", NTC-thermistor), a PTC element ("Positive Temperature Coefficient", PTC-thermistor), a thermocouple, a Peltier element or some other type of temperature measuring element.

The temperature sensing element 136 is connected by one or more electrical connection lines 138 to an evaluating circuit 140 of the electro-chemical device 100 which is shown purely schematically as a block in FIG. 3.

A voltage for example can be applied to the temperature sensing element 136 over the electrical connection lines 138 in order to measure a temperature-dependent electrical resistance of the temperature sensing element 136.

As an alternative or in addition thereto, a temperature-dependent electrical voltage produced by the temperature sensing element 136 can be conveyed to the evaluating circuit 140 by means of the electrical connection line 138.

In each case, the evaluating circuit 140 determines the actual instantaneous temperature of the temperature sensing element 136 on the basis of an electrical characteristic of the temperature sensing element 136 which varies in temperature-dependent manner.

Figure 2:
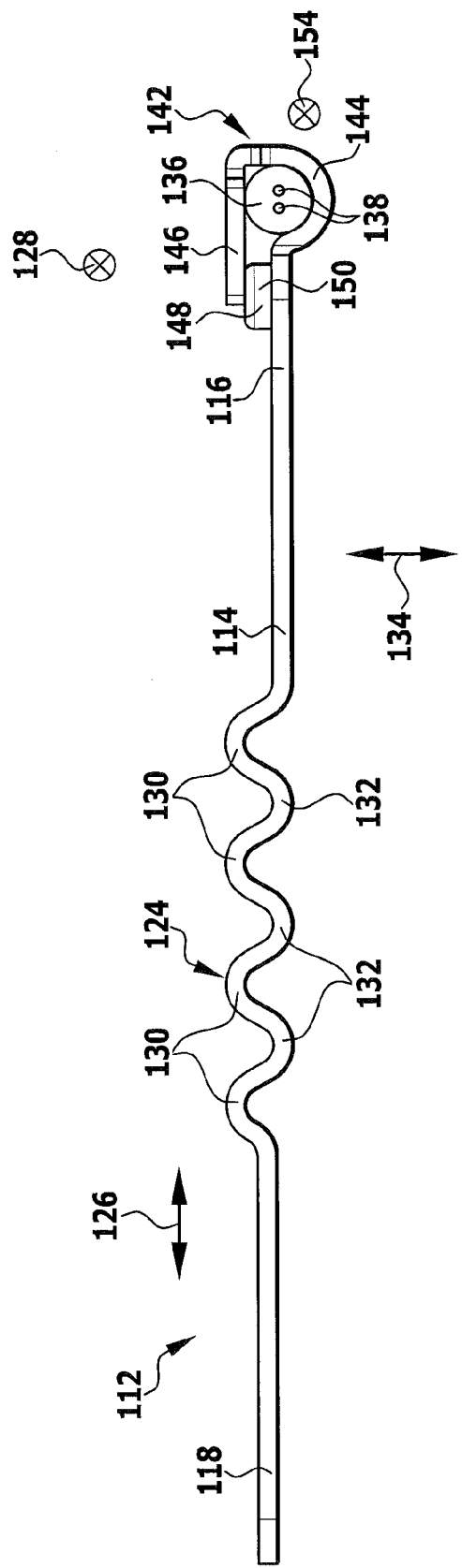
FIG. 2 a schematic side view of the cell connector depicted in FIG. 1 without the electro-chemical cells that are connected together by the cell connector.
Figure 4:
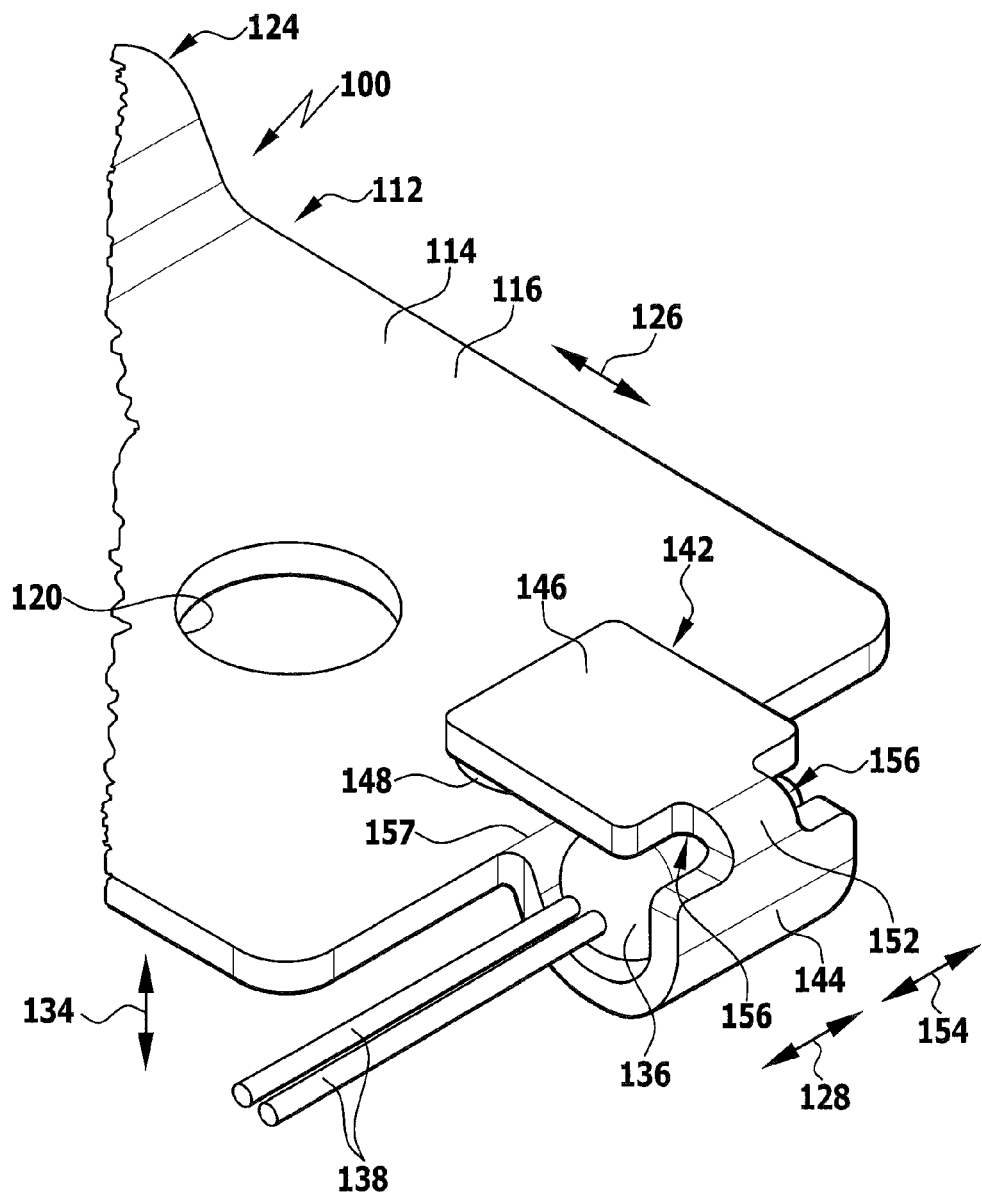
FIG. 4 a perspective illustration of a contact region of the cell connector depicted in FIGS. 1 to 3 having a temperature sensing element holder arranged thereon as viewed from a side of the temperature sensing element holder remote from the contact region.
Figure 5:
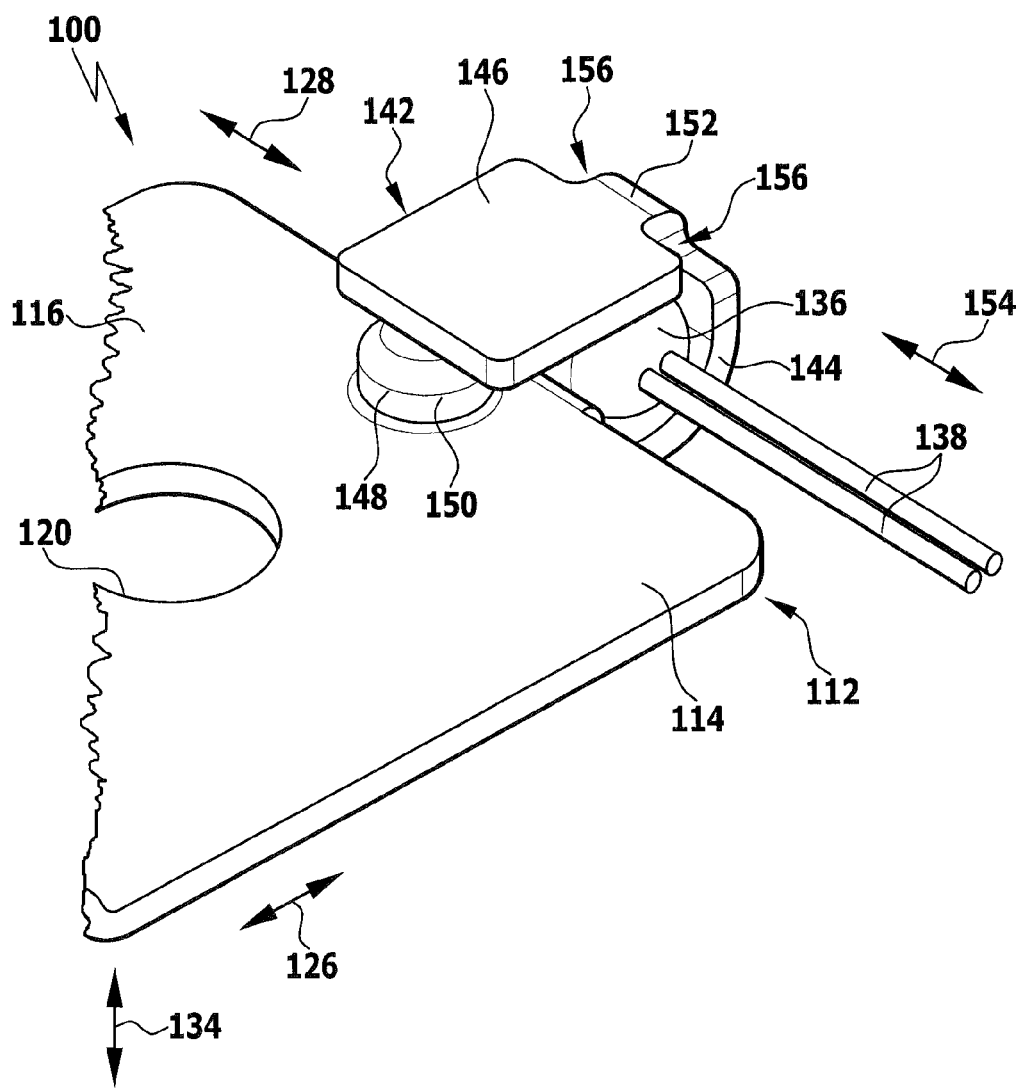
FIG. 5 a perspective illustration of the contact region depicted in FIG. 4 having the temperature sensing element holder arranged thereon as viewed from the side of the temperature sensing element holder facing the contact region.
Figure 6:
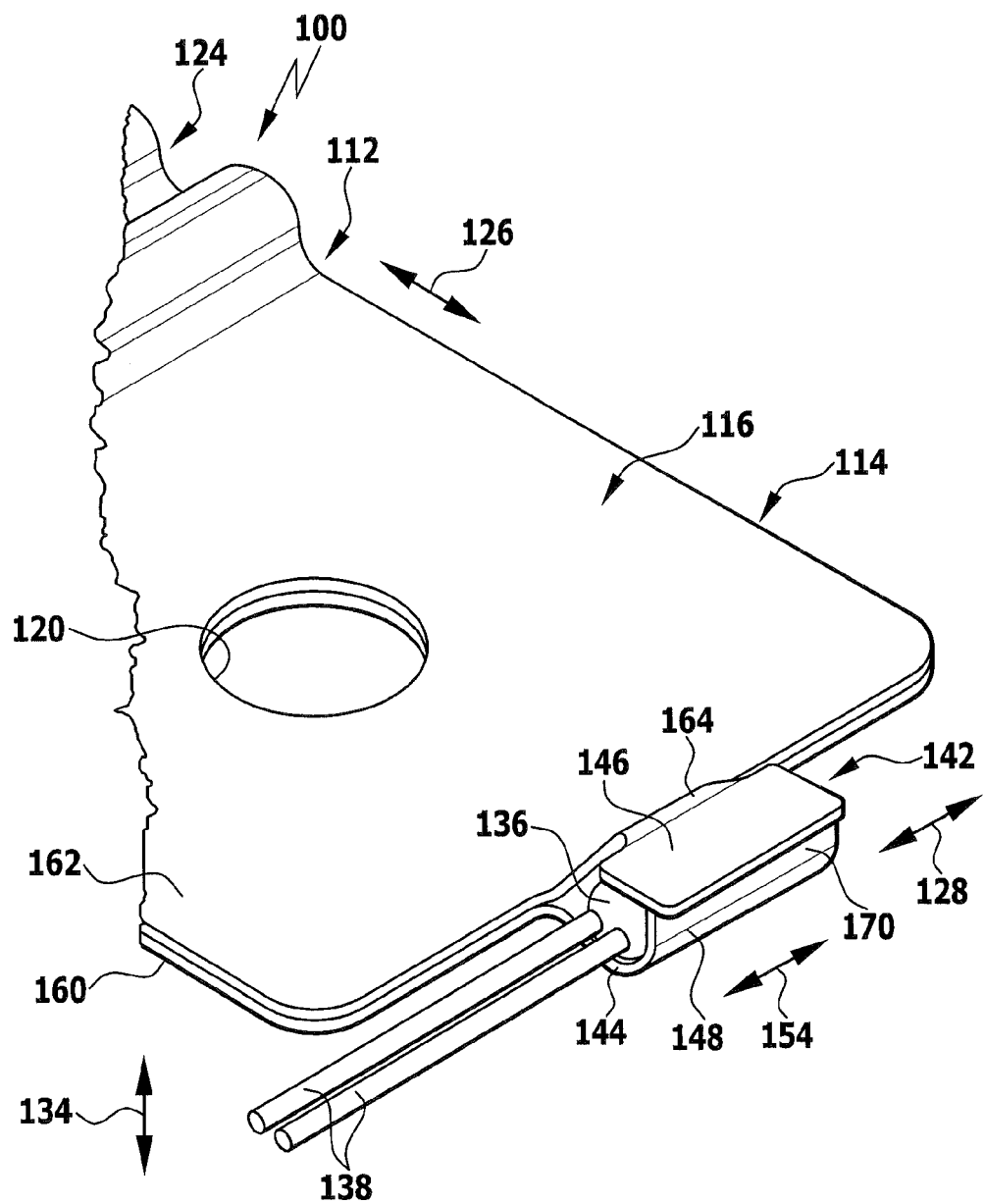
FIG. 6 a perspective illustration of a contact region of a second embodiment of a cell connector having a temperature sensing element holder arranged thereon, wherein the cell connector has a two-layered base body and the temperature sensing element holder comprises a pocket arranged on a first layer of the base body and a flap arranged on a second layer of the base body, as viewed from a side of the temperature sensing element holder remote from the contact region.

As can best be seen from FIGS. 2, 4 and 5, the temperature sensing element 136 is accommodated in a temperature sensing element holder 142 which surrounds the temperature sensing element 136 in substantially ring-like manner and thus ensures intimate contact with good heat transferring properties between the temperature sensing element holder 142 and the temperature sensing element 136 and furthermore, the temperature sensing element 136 is prevented from moving relative to the temperature sensing element holder 142 and relative to the base body 114 of the cell connector 112 in a radial direction of the temperature sensing element 136 due to it being a form-fit in the temperature sensing element holder 142.

In the embodiment of a cell connector 112 that is shown in FIGS. 1 to 5, the temperature sensing element holder 142 comprises a pocket 144 for accommodating the temperature sensing element 136 and a flap 146 for restraining the temperature sensing element 136 in the pocket 144.

Furthermore, the temperature sensing element holder 142 comprises a stop 148 which is in the form of an e.g. dome-shaped bump 150 and which projects upwardly from a boundary region of the first contact region 116 (i.e. to the side remote from the electro-chemical cells 102).

The flap 146 of the temperature sensing element holder 142 abuts the upper surface of the stop 148 so that the flap 146 cannot move downwardly any further and the temperature sensing element 136 is protected from being damaged by the flap 146 in this way.

The stop 148 is preferably formed in one piece manner with the base body 114 of the cell connector 112.

The stop 148 can, for example, be formed from the material of the first contact region 116 of the base body 114 by a forming process, in particular by a stamping process or a deep-drawing process.

In this embodiment, the flap 146 and the pocket 144 are connected to each other in one piece manner by a web member 152.

In the transverse direction 128 of the cell connector 112 which corresponds to the longitudinal direction 154 of the temperature sensing element 136 in this embodiment, the web member 152 is bounded on both sides by a recess 156 so that the extent of the web member 152 in the transverse direction 128 of the cell connector 112 or in the longitudinal direction 154 of the temperature sensing element 136 is smaller than the extent of the flap 146 and the extent of the pocket 144 in the same direction.

The web member 152 is thus more easily deformable than the flap 146 and the pocket 144.

The flap 146 is in the form of a substantially rectangular plate for example.

The pocket 144 is substantially trough-shaped for example, its cross section taken in the longitudinal direction 126 of the cell connector 112 being substantially U-shaped.

The edge of the pocket 144 opposite the web member 152 merges into the first contact region 116 of the base body 114 along a bending line 157 so that the pocket 144 and thus too the flap 146 are connected to the base body 114 in one piece manner.

The space remaining within the temperature sensing element holder 142 externally of the temperature sensing element 136 is occupied at least partially, and preferably substantially entirely, by an adhesive layer 158 which at least partly surrounds the periphery of the temperature sensing element 136 and forms a substance-to-substance bond with the pocket 144 and/or with the flap 146 of the temperature sensing element holder 142.

In the first place, due to the adhesive layer 158 and the substance-to-substance bond produced thereby, the effect is achieved that extracting the temperature sensing element 136 from the temperature sensing element holder 142 in the longitudinal direction 154 of the element is prevented.

Secondly, the adhesive layer 158 is effective to provide a large heat transfer surface and a low thermal resistance between the temperature sensing element holder 142 on the one hand and the temperature sensing element 136 on the other.

The adhesive layer 158 is formed from a thermally conductive adhesive.

A thermally conductive adhesive may, for example, be a two component epoxy resin, an elastomer, a conductive synthetic material, or, any other material of an adhesive nature and having good thermal conductivity can be used.

In particular, one suitable thermally conductive adhesive is the medium viscosity, two-component epoxy resin adhesive marketed under the name Hysol® 9497 by the company Henkel AG & Co. KGaA, Henkelstrasse 67, 40191 Düsseldorf, Germany. In regard to the chemical and physical properties and the work steps for processing this adhesive, reference is made to the technical data sheet for the adhesive Hysol® 9497 dated February 2008, and in this regard, the aforementioned data sheet is hereby incorporated into the present description.

For the purposes of producing the temperature sensing element holder 142 and fixing the temperature sensing element 136 to the base body 114 of the cell connector 112, one proceeds as follows.

Firstly, the base body 114 of the cell connector 112 including a pre-form for the pocket 144 and the flap 146 is separated out from a raw material such as a sheet-like raw material for example, namely, punched out or cut out (for example by means of a laser) for example.

The stop 148 and the compensation region 124 are introduced into the base body 114 of the cell connector 112 by suitable forming processes, in particular, by stamping or deep-drawing processes.

Subsequently, the trough-shaped pocket 144 is produced from the pocket pre-form by a forming process such as a stamping or deep-drawing process for example.

The web member 152 and the flap 146 are initially located in an extension of the free limb of the trough-shaped pocket 144 remote from the first contact region 116 so that the temperature sensing element holder 142 is open in the upward direction.

The conductive adhesive from which the adhesive layer 158 is subsequently formed is then placed in the trough-shaped pocket 144.

The temperature sensing element 136 is then inserted into the pocket 144.

Thereafter, the flap 146 is moved downwardly by deformation of the web member 152 from a position in which it is oriented in parallel with the contact direction 134 of the cell connector 112 into a position in which it is oriented perpendicularly with respect to the contact direction 134 in order to close the temperature sensing element holder 142 in the upward direction, such movement continuing until the lower surface of the flap 146 strikes the stop 148 whereupon further movement of the flap 146 is prevented and the temperature sensing element 136 is protected from damage.

The process of fixing the temperature sensing element 136 to the base body 114 of the cell connector 112 comes to an end after the adhesive used for forming the adhesive layer 158 has hardened.

The previously described steps of the process for the production of the base body 114 and the temperature sensing element holder 142 as well as for the fixing of the temperature sensing element 136 to the base body 114 could also be effected in any other sequence. Furthermore, it is possible to implement two or more of these process steps simultaneously.

A second embodiment of a cell connector 112 for connecting a first cell terminal 108a of a first electro-chemical cell 102a and a second cell terminal 108b of a second electro-chemical cell 102b in an electrically conductive manner that is shown in FIGS. 6 to 9 differs from the previously described embodiment shown in FIGS. 1 to 5 in that the base body 114 of the cell connector 112 in the second embodiment is not in the form of a single layer but rather, it comprises multiple layers, and in particular, it comprises two layers.

In this embodiment, the base body 114 comprises in particular a first layer 160 which faces the cell terminals 108a, 108b that are to be connected in the installed state of the cell connector 112 and a second layer 162 which is arranged on the side of the first layer 160 that is remote from the cell terminals 108a and 108b in the installed state of the cell connector 112.

The first layer 160 and the second layer 162 are substantially mutually congruent except in the region of the temperature sensing element holder 142 which will be described in more detail hereinafter.

The first layer 160 and the second layer 162 are preferably laminated to one another in order to enable them to be handled as a unit.

The lamination of the first layer 160 and the second layer 162 can, for example, be produced by welding and especially laser-welding the first layer 160 and the second layer 162 together, in particular, along the peripheries thereof.

In the case of this embodiment of a cell connector 112 too, provision is made for a temperature sensing element holder 142 in which the temperature sensing element 136 is accommodated.

In this embodiment, the temperature sensing element holder 142 comprises a pocket 144 which is preferably connected to the first layer 160 in one piece manner, and a flap 146 which is connected by a web member 164 to the second layer 162 of the base body 114 in one piece manner.

The web member 164 is bounded laterally by two recesses 166 in the transverse direction 128 of the cell connector 112 so that the extent of the web member 164 in the transverse direction 128 of the cell connector 112 is smaller than the extent of the flap 146 in the same direction.

The effect is thereby achieved that the web member 164 is more easily deformable than the flap 146 so that the temperature sensing element holder 142 can be closed in a particularly easy manner by deforming the web member 164 when assembling the cell connector 112.

Figure 7:
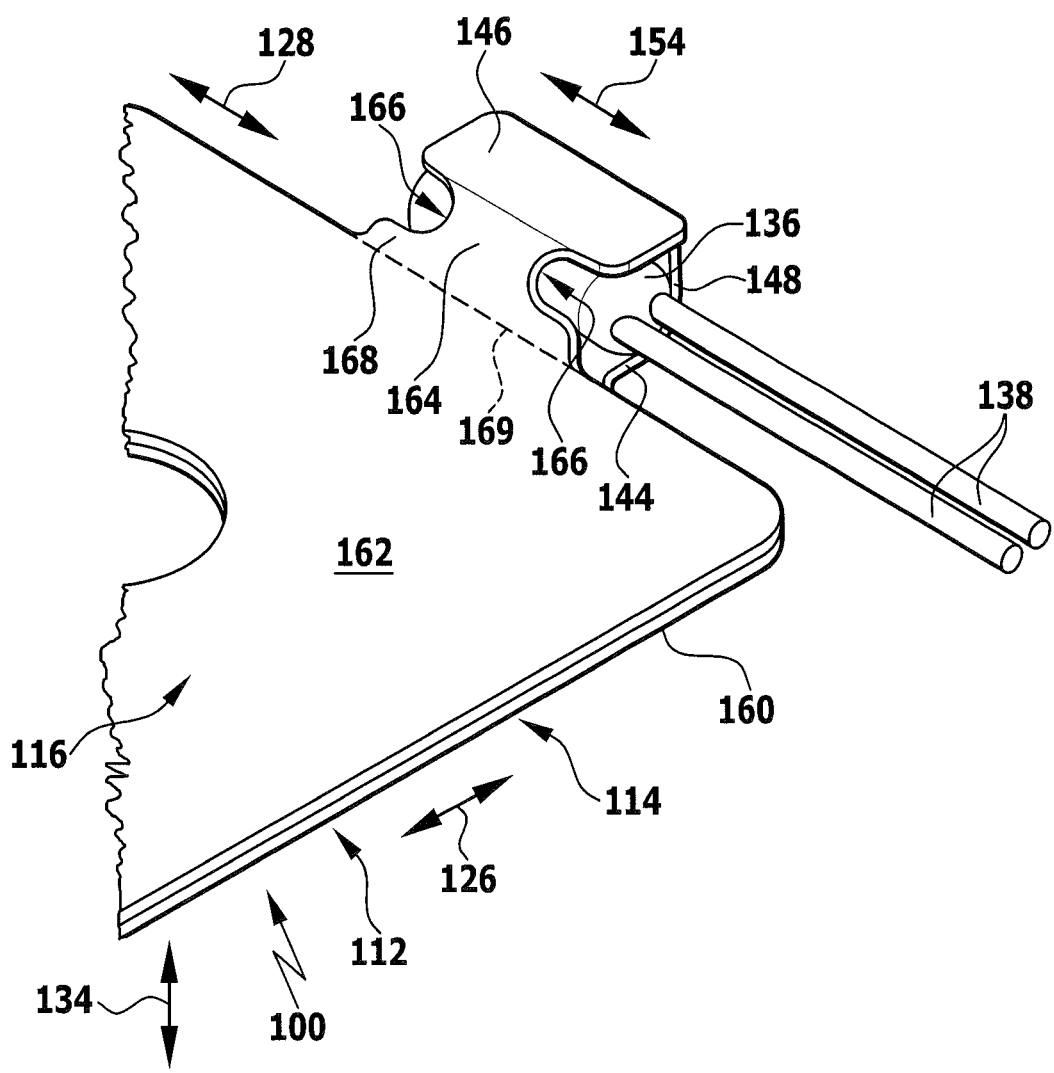
FIG. 7 a perspective illustration of the contact region with the temperature sensing element holder depicted in FIG. 6 as viewed from the side of the temperature sensing element holder facing the contact region.
Figure 8:
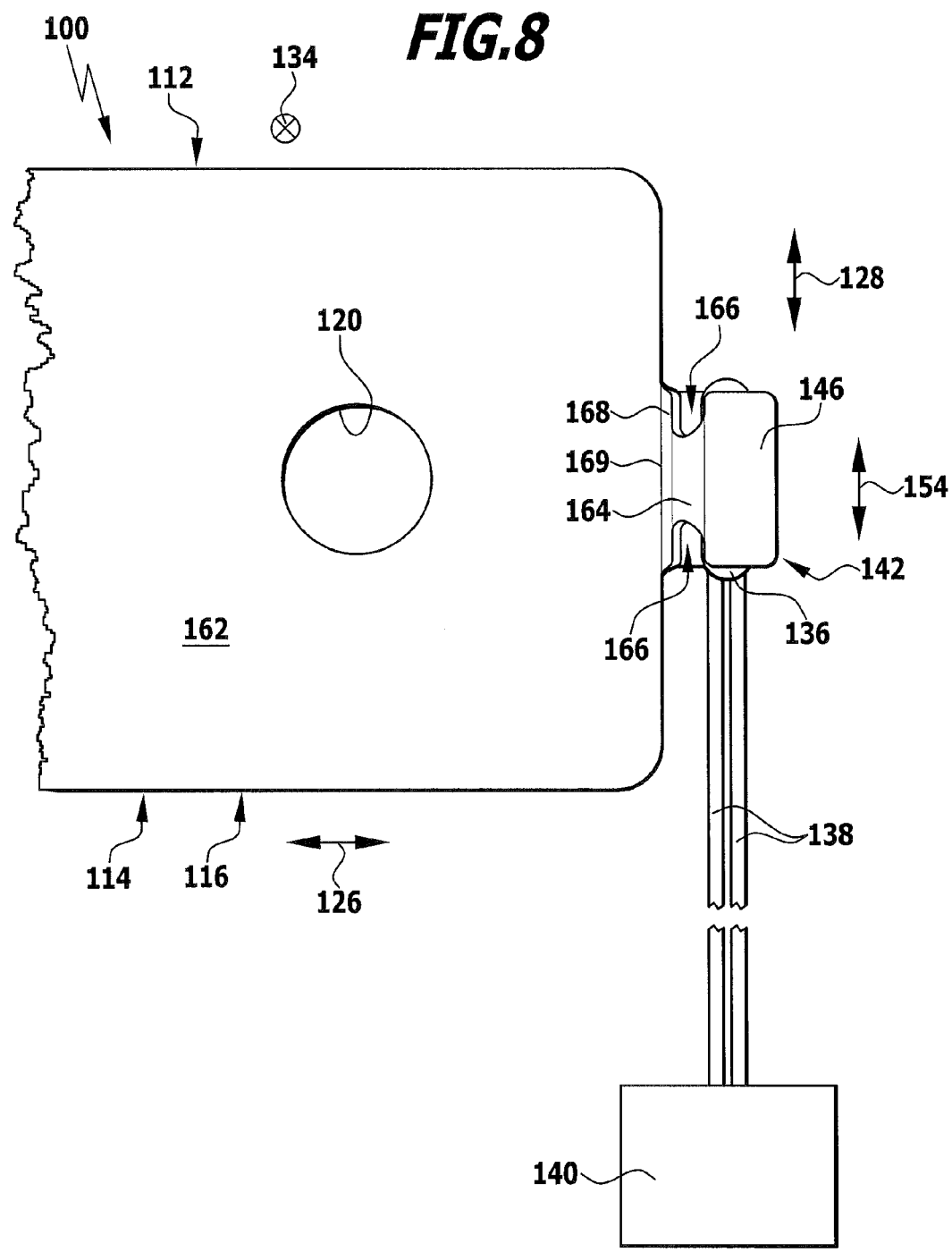
FIG. 8 a schematic plan view from above of the contact region with the temperature sensing element holder depicted in FIGS. 6 and 7.

Adjoining the web member 164 on the side opposite the flap 146, there is a connecting section 168 which merges along a bending line 170 into the second layer 162 of the base body 114 of the cell connector 112 (see FIG. 7 in particular).

Figure 9:
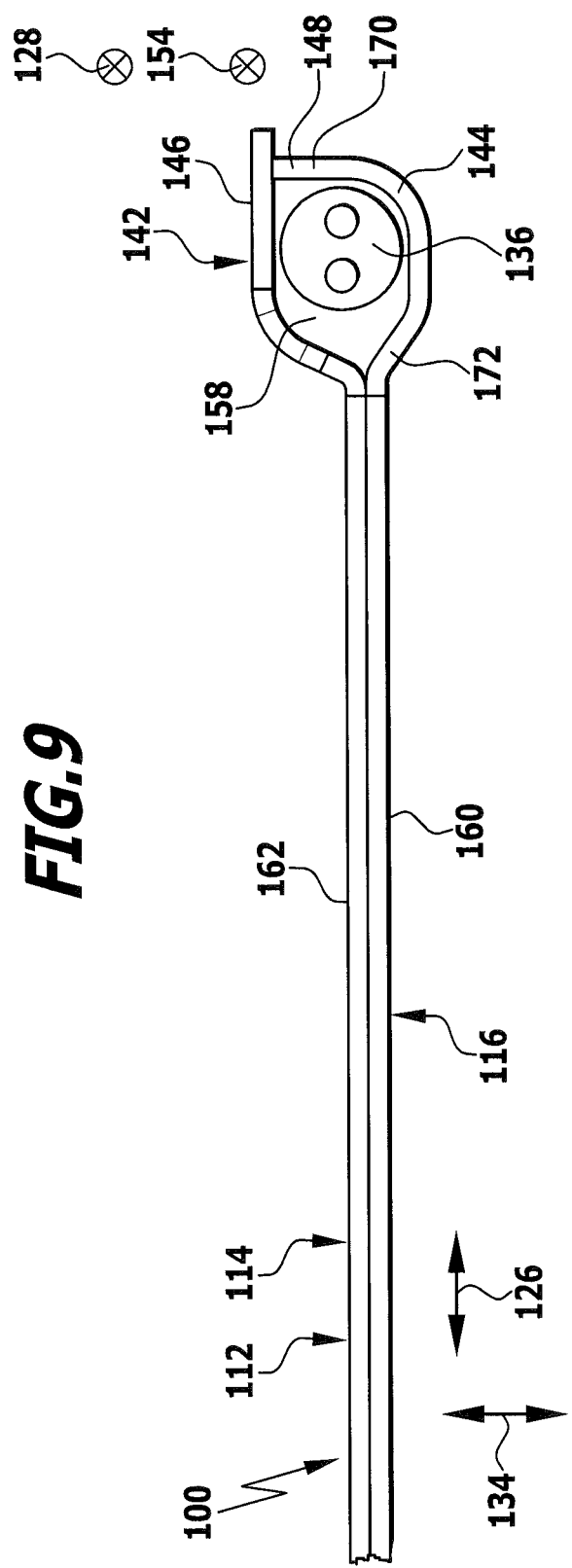
FIG. 9 a schematic side view of the contact region with the temperature sensing element holder depicted in FIGS. 6 to 8.

As can best be seen from the side view of FIG. 9, the lower surface of the flap 146 abuts a free limb 170 of the pocket 144 which extends in the contact direction 134 of the cell connector 112 in the assembled state of the cell connector 112 so that, in this embodiment, this free limb 170 of the pocket 144 serves as a stop 148 which limits the deformation path of the flap 146 and thus prevents damage to the temperature sensing element 136 in the temperature sensing element holder 142 when closing the temperature sensing element holder 142.

In this embodiment, the pocket 144 is substantially trough-shaped as was the case in the first embodiment.

The pocket 144 has a—taken in the longitudinal direction 126 of the cell connector 112—substantially U-shaped cross section, whereby however, in this embodiment, the free limb 170 of the pocket 144 extends to a greater extent in the contact direction 134 than the opposite limb 172 of the pocket 144 by means of which the pocket 144 is connected in one piece manner to the first contact region 116 of the first layer 160 of the base body 114.

In the case of this embodiment too, the gap between the temperature sensing element holder 142 which is formed by the pocket 144 and the flap 146 on the one hand and the periphery of the temperature sensing element 136 on the other is at least partly filled up by an adhesive layer 158 consisting of a thermally conductive adhesive.

For the purposes of producing the second embodiment of a cell connector 112 having a temperature sensing element 136 affixed thereto, one proceeds as follows for example.

The first layer 160 and the second layer 162 of the base body 114 are separated out from a suitable raw material, in particular, from a metallic sheet of material by being e.g. punched out or cut out (by means of a laser for example).

A pocket pre-form is produced on the first layer 160 by a forming process, in particular, by a stamping or deep-drawing process in such a way that the trough-shaped pocket 144 is formed.

A flap pre-form is formed on the second layer 162 in such a way that the substantially plate-like flap 146 extends approximately in parallel with the contact direction 134 of the cell connector 112 away from the main plane of the second layer 162 (perpendicularly to the contact direction 134).

Thereafter, the first layer 160 and the second layer 162 are placed together in such a way that their outer contours are substantially flush with one another except in the region of the temperature sensing element holder 142, and they are then laminated to one another by welding along their periphery for example.

Subsequently, the adhesive from which the adhesive layer 158 is to be formed is placed in the trough-shaped pocket 144.

The temperature sensing element 136 is then inserted into the pocket 144 and the temperature sensing element holder 142 is closed in the upward direction by moving the flap 146 with corresponding deformation of the web member 164 from its starting position parallel to the contact direction 134 into the closed position illustrated in FIGS. 6 to 9, perpendicular to the contact direction 134.

The impingement of the flap 146 on the free limb 170 of the pocket 144 serving as a stop 148 prevents the temperature sensing element 136 from being damaged when closing the temperature sensing element holder 142.

After hardening of the adhesive layer 158, the process of producing the cell connector 112 with the temperature sensing element 136 affixed thereto has reached its conclusion.

In the case of the previously described production process too, the sequence of the process steps is, in principle, quite arbitrary.

Furthermore, it is possible to carry out two or more of these process steps at the same time.

In this embodiment, the number of layers of the base body 114 is not limited to two; in particular, as many further layers of the base body 114 as desired can be arranged between the first layer 160 and the second layer 162.

Furthermore, it is possible to arrange one or more additional layers of the base body 114 on the side of the first layer 160 which faces the cell terminals 108a, 108b in the installed state of the cell connector 112 and/or on the side of the second layer 162 remote from the cell terminals 108a, 108b in the installed state of the cell connector 112.

In all other respects, the second embodiment of a cell connector 112 with a temperature sensing element 136 that is shown in FIGS. 6 to 9 corresponds in regard to the construction, functioning and production thereof to the first embodiment shown in FIGS. 1 to 5 and so to that extent, reference is made to the preceding description thereof.

Figure 10:
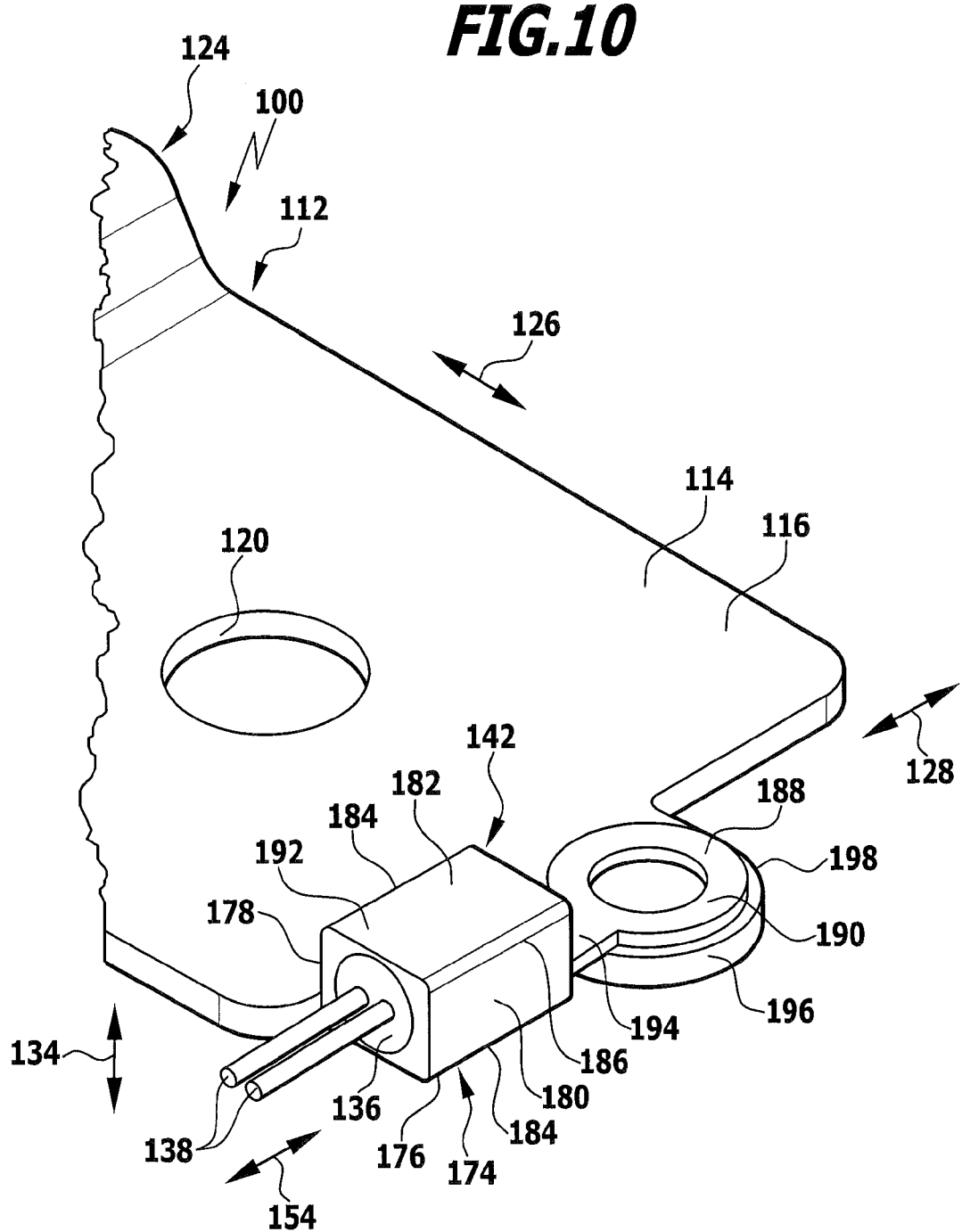
FIG. 10 a perspective illustration of a contact region of a third embodiment of a cell connector with a temperature sensing element arranged in a housing, wherein the housing is fixed to a projection of the base body of the cell connector.

A third embodiment of a cell connector 112 having a temperature sensing element 136 affixed thereto which is shown in FIGS. 10 to 12 differs from the first embodiment shown in FIGS. 1 to 5 in that the temperature sensing element holder 142 in the third embodiment is not formed in one piece manner with the base body 114 of the cell connector 112, but instead it is formed by a temperature sensing element housing 174 in which the temperature sensing element 136 is at least partly arranged and which for its part is fixed to the base body 114 of the cell connector 112, preferably by means of a substance-to-substance bond.

The temperature sensing element housing 174 is substantially cuboidal for example and can comprise a bottom wall 176, an inner side wall 178 facing the base body, an outer side wall 180 remote from the base body 114 and a cover wall 182 opposite the bottom wall 176.

On the remaining housing sides, i.e. to the front and to the rear—as seen in the transverse direction 128 of the cell connector 112, the temperature sensing element housing 174 is preferably open.

The temperature sensing element housing 174 can, for example, be formed from a strip of a raw material, a metallic sheet material for example, by repeatedly bending it at bending lines 184.

In connection therewith, one edge 186 of the temperature sensing element housing 174 does not form a bending line at which mutually adjacent walls of the temperature sensing element housing 174 are connected to one another in one piece manner, but rather, it forms a common edge line along which the free edges of two mutually adjacent walls of the temperature sensing element housing 174 fit together.

This "open" edge 186 can, in principle, be arranged between any two walls of the temperature sensing element housing 174, for example, between the cover wall 182 and the outer side wall 180.

Furthermore, the temperature sensing element housing 174 may comprise an extension 188 by means of which the temperature sensing element housing 174 is fixable to the base body 114 of the cell connector 112.

As can best be seen from FIG. 11, such an extension 188 may comprise a disk-like or ring-like section 190 which abuts the base body 114 and a connecting section 194 which connects the ring-like section 190 to the base body 192 of the temperature sensing element housing 174.

In connection therewith, the base body 192 of the temperature sensing element housing 174 comprises the walls 176, 178, 180 and 182 of the temperature sensing element housing 174 which surround the temperature sensing element 136.

The extension 188 can, in particular, be formed in one piece manner with the base body 192 and in particular, with its bottom wall 176.

In order to enable the extension 188 to be fixed to the base body 114, the base body 114 has a projection 196 for example, which protrudes from the first contact region 116 in the longitudinal direction 126 of the cell connector 112 for example.

The projection 196 may have a semicircular section 198 for example.

The extension 188 of the temperature sensing element housing 174 is preferably connected to the projection 196 of the base body 114 of the cell connector 112 by means of a substance-to-substance bond.

This substance-to-substance bond can, for example, be produced by welding, in particular laser welding, ultrasonic welding, resistance welding and/or friction welding, by soldering and/or by adhesion.

Due to the substance-to-substance bond between the temperature sensing element housing 174 and the base body 114 of the cell connector 112, good heat transfer with low thermal resistance is obtained between the base body 114 on the one hand and the temperature sensing element 136 accommodated in the temperature sensing element housing 174 on the other so that the temperature determined by the evaluating circuit 140 by means of the temperature sensing element 136 corresponds as precisely as possible to the temperature in the first contact region 116 of the cell connector 112.

As was the case for the first two embodiments, provision may also be made in the third embodiment for the gap between the temperature sensing element holder 142 which here is in the form of the temperature sensing element housing 174 on the one hand and the periphery of the temperature sensing element 136 on the other to be at least partly filled with an adhesive layer 158 consisting of a thermally conductive adhesive. Good heat transfer between the base body 192 of the temperature sensing element housing 174 and the temperature sensing element 136 is thereby obtained.

For the purposes of producing the third embodiment of a cell connector 112 with the temperature sensing element 136 affixed thereto, one proceeds as follows.

The base body 114 is separated out with the desired outer contour (including the projection 196) from a suitable raw material such as a metallic sheet material for example, by being punched out or cut out (in particular, by means of a laser) for example.

A temperature sensing element housing pre-form, which comprises the extension 188 and a strip for the subsequent formation of the base body 192 of the temperature sensing element housing 174, is separated out from a suitable raw material.

The same materials as were mentioned hereinabove as materials for the base body 114 of the cell connector 112 come into consideration for the material of the temperature sensing element housing 174, thus in particular, the metals aluminum, copper, tin, zinc, iron, gold and/or silver, alloys of the aforementioned metals, other metals or alloys of other metals, conductive synthetic materials and/or conductive carbon materials.

A preliminary trough-shaped holder, consisting of the bottom wall 176, the inner side wall 178 and the outer side wall 180 for example, for the temperature sensing element 136 is firstly formed on the temperature sensing element housing pre-form by means of a suitable forming process, wherein this preliminary holder is initially still open at the upper side thereof, due for example to the fact that the cover wall 182 has not yet been bent over, but still extends parallel to the inner side wall 178 for example.

The adhesive, from which it is intended that the adhesive layer 158 will be formed, is placed in this trough-shaped holder.

Subsequently, the temperature sensing element 136 is inserted into the holder and the holder is closed by bending the cover wall 182 so that the temperature sensing element housing 174 which is shown in FIGS. 10 to 12 thereby ensues.

This temperature sensing element housing 174 is connected at the extension 188 and in particular at the ring-like section 190 thereof to the base body 114 and in particular to the projection 196 thereof by means of a substance-to-substance bond.

This substance-to-substance bond can, for example, be produced by welding, in particular, by laser welding, ultrasonic welding, resistance welding and/or friction welding, by soldering and/or by adhesion.

The previously described process steps for the production of the cell connector 112 with a temperature sensing element 136 affixed thereto can, in principle, be varied as desired in regard to the sequence thereof.

Furthermore, it is possible to carry out two or more of these process steps at the same time.

In all other respects, the third embodiment of a cell connector 112 with a temperature sensing element 136 that is shown in FIGS. 10 to 12 corresponds in regard to the construction, functioning and production thereof to the first embodiment shown in FIGS. 1 to 5 and to the second embodiment shown in FIGS. 6 to 9 and so to this extent reference is made to the previous description thereof.

In particular, the base body 114 can, in principle, also be formed of plurality of layers in the third embodiment of a cell connector 112.

The invention claimed is:

1. A cell connector for connecting a first cell terminal of a first electro-chemical cell and a second cell terminal of a second electro-chemical cell of an electro-chemical device in an electrically conductive manner,
   wherein the cell connector comprises a base body consisting of an electrically conductive material and a temperature sensing element fixed to the base body,
   wherein the base body comprises a temperature sensing element holder in which the temperature sensing element is at least partly accommodated,
   wherein the temperature sensing element holder comprises a pocket for accommodating the temperature sensing element and the temperature sensing element holder further comprises a flap for restraining the temperature sensing element in the pocket,
   wherein the flap is connected to the pocket by a web member, and
   wherein the web member is bounded by at least one recess so that an extent of the web member in a longitudinal direction of the temperature sensing element is smaller than the extent of the flap in the same direction and smaller than the extent of the pocket in the same direction.

2. A cell connector in accordance with claim 1, wherein the temperature sensing element holder surrounds the temperature sensing element over at least half of the periphery of the temperature sensing element.

3. A cell connector in accordance with claim 1, wherein the pocket and the flap are formed together in one piece manner.

4. A cell connector in accordance with claim 1, wherein the pocket is formed in one piece manner with a first layer of the base body and the flap is formed in one piece manner with a second layer of the base body.

5. A cell connector in accordance with claim 1, wherein the temperature sensing element is fixed to the temperature sensing element holder by adhesion by an adhesive.

6. A cell connector in accordance with claim 5, wherein the adhesive has a thermal conductivity.

7. A cell connector in accordance with claim 1, wherein the temperature sensing element is arranged at least partly in a temperature sensing element housing which is fixed to the base body of the cell connector.

8. A cell connector in accordance with claim 7, wherein the base body of the cell connector comprises a projection to which the temperature sensing element housing is fixed.

9. A cell connector in accordance with claim 7, wherein the temperature sensing element housing is fixed to the base body by means of a substance-to-substance bond.

10. A cell connector in accordance with claim 7, wherein the largest extent of the temperature sensing element housing is smaller than the largest extent of the base body of the cell connector in a transverse direction of the cell connector which runs perpendicularly to a plane which contains the longitudinal axes of the two electro-chemical cells in the installed state of the cell connector.

11. A cell connector in accordance with claim 1, wherein the temperature sensing element is an NTC element, a PTC element, a thermocouple or a Peltier element.

12. An electro-chemical device comprising at least a first electro-chemical cell having a first cell terminal, a second electro-chemical cell having a second cell terminal and a cell connector which connects the first cell terminal of the first electro-chemical cell and the second cell terminal of the second electro-chemical cell of the electro-chemical device in an electrically conductive manner,
   wherein the cell connector comprises a base body consisting of an electrically conductive material and a temperature sensing element fixed to the base body,
   wherein the base body comprises a temperature sensing element holder in which the temperature sensing element is at least partly accommodated,
   wherein the temperature sensing element holder comprises a pocket for accommodating the temperature sensing element and the temperature sensing element holder further comprises a flap for restraining the temperature sensing element in the pocket,
   wherein the flap is connected to the pocket by a web member, and
   wherein the web member is bounded by at least one recess so that an extent of the web member in a longitudinal direction of the temperature sensing element is smaller than the extent of the flap in the same direction and smaller than the extent of the pocket in the same direction.

13. A cell connector in accordance with claim 1, wherein the temperature sensing element holder comprises a stop which is in the form of a bump and which projects upwardly from a contact region of the base body and wherein the flap abuts an upper surface of the stop.

\* \* \* \* \*

UNITED STATES PATENT AND TRADEMARK OFFICE
CERTIFICATE OF CORRECTION

| | | |
|---|---|---|
| PATENT NO. | : 9,105,949 B2 | Page 1 of 1 |
| APPLICATION NO. | : 13/739536 | |
| DATED | : August 11, 2015 | |
| INVENTOR(S) | : Diez et al. | |

It is certified that error appears in the above-identified patent and that said Letters Patent is hereby corrected as shown below:

Title Page, item (30)

On Page 1, under the heading "Foreign Application Priority Data," the last digit of the foreign application number was omitted, it should appear as follows:

Foreign Application Priority Data

July 15, 2010 (DE) . . . . . . . . . . . . 10 2010 031 380.7

Signed and Sealed this
Fifteenth Day of March, 2016

Michelle K. Lee
*Director of the United States Patent and Trademark Office*